United States Patent [19]

Nagahiro et al.

[11] 3,817,437

[45] June 18, 1974

[54] MAGNETIC RECORDING AND REPRODUCING SYSTEM OF AUTOTHREADING TYPE

[75] Inventors: Michinori Nagahiro, Nishinomiya; Yoshinobu Nakata, Osaka, both of Japan

[73] Assignee: Matsushita Electric Industrial Co., Ltd., Osaka, Japan

[22] Filed: Nov. 28, 1972

[21] Appl. No.: 310,002

[30] Foreign Application Priority Data

Dec. 1, 1971 Japan .............................. 46-097360

[52] U.S. Cl. .................................. 226/91, 242/195

[51] Int. Cl. ............................................ G03b 1/56

[58] Field of Search .......... 226/90, 91, 92; 242/188, 242/195, 67.4

[56] References Cited

UNITED STATES PATENTS

| | | | |
|---|---|---|---|
| 3,254,856 | 6/1966 | Camras | 242/188 |
| 3,297,267 | 1/1967 | Wiggs | 242/195 |
| 3,675,877 | 7/1972 | Rempala | 242/195 |
| 3,677,495 | 7/1972 | Villers | 242/195 |
| 3,704,836 | 12/1972 | Yamada | 242/188 |

*Primary Examiner*—Allen N. Knowles

*Attorney, Agent, or Firm*—Stevens, Davis, Miller & Mosher

[57] ABSTRACT

A magnetic recording and reproducing system of autothreading type using a magnetic tape provided at the pay-off end of the magnetic tape with a leader tape having greater rigidity than the magnetic tape. The leader tape is wound on a pay-off reel and a take-up reel so that its opposite sides may face the cores of the pay-off and take-up reels, respectively, thereby ensuring that its tip may be readily separated from the periphery of the tape roll on the pay-off reel.

3 Claims, 6 Drawing Figures

MAGNETIC RECORDING AND REPRODUCING SYSTEM OF AUTOTHREADING TYPE

This invention relates to magnetic recording and reproducing systems, generally called autothreading type, comprising a take-up reel and a tape cartridge containing a pay-off reel with a magnetic tape wound thereon and provided at the pay-off end of the magnetic tape with a leader tape having greater width and greater rigidity than the magnetic tape, whereby the leader tape fed from the cartridge is automatically led to the take-up reel. It enables a particular manner of winding the leader tape on both pay-off and take-up reels in such magnetic recording and reproducing systems.

In a general magnetic recording and reproducing system of the autothreading type, a magnetic tape with a leader tape 2 is wound on a pay-off reel 1 such as shown in FIG. 6. As is shown, a surface of tape 2 facing the core of pay-off reel 1 also faces the core of take-up reel 3 when the tape is taken up on take-up reel 3. Such a method of winding of a tape presents a problem such that a leader tape having slight plasticity aquires a curving inclination after it has been left wound on a core of the take-up reel for a long time, particularly at high ambient temperatures above 50° C, which inclination causes the tip end of the leader tape to stick to the outer surface of the tape roll when the leader tape is rewound on the pay-off reel. Therefore, for the subsequent paying-off of the leader tape from the pay-off reel at the next time of use, it is necessary to provide means for separating the tip of the leader tape from the outer surface of the tape roll or to apply special treatment of the tip end of the leader tape so that it may be readily separated from the outer surface of the tape roll.

An object of the invention is to provide a magnetic recording and reproducing system which makes it possible to pay off a leader tape through a cartridge opening without the necessity of providing tip separating means or applying a special treatment to the tip end of the leader tape.

With the method of winding a leader tape on a pay-off and a take-up reel according to the present invention, an inclination which a leader tape aquires after it has been left wound on a take-up reel for a long time and at a high temperature is such that it makes the leader tape go out of the cartridge through its opening when the tape is paid off from the cartridge at the next time of use. Thus, the present invention can obviate the necessity of providing leader tape tip separating means or applying special treatment to the tip end of the leader tape and present misthreading of a tape.

The above and other objects, features and advantages of the present invention will become more apparent from the following description taken in conjunction with the accompanying drawings, in which.

Figure 1:
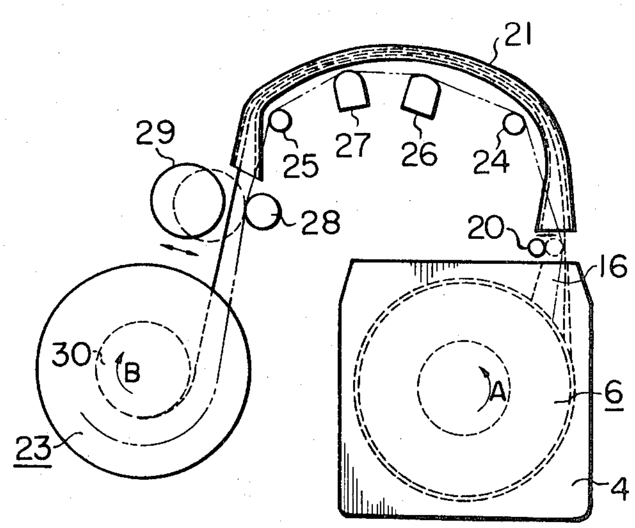
FIG. 1 is a plan view showing an example of a magnetic recording and reproducing system according to the method of tape winding of this invention.
Figure 2:
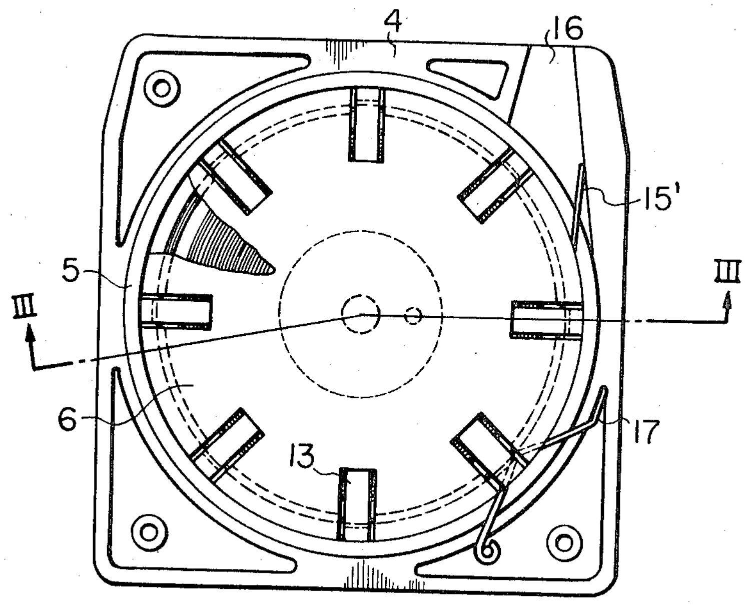
FIG. 2 is a plan view, partly broken away, showing an example of a cartridge used in the magnetic recording and reproducing system of FIG. 1.
Figure 3:
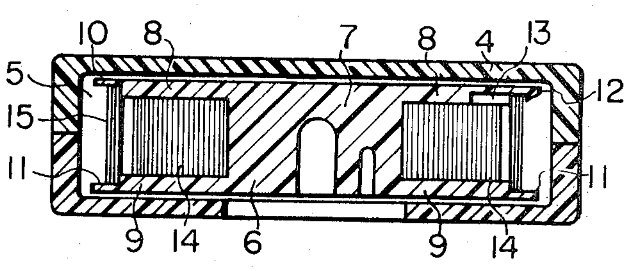
FIG. 3 shows the cross-section of the cartridge taken along the line III-III shown in FIG. 2.

Referring now to FIGS. 1 to 5 which show one embodiment of the invention, a cartridge 4 has an inner cylindrical space 5, within which a pay-off reel 6 is accommodated. The pay-off reel 6 has a hub or a core 7, an upper flange 8 and a lower flange 9. These flanges 8 and 9 have respective inner peripheral stepped portions 10 and 11 which form a space therebetween accommodating a leader tape 15. The upper flange 8 also has a plurality of radially and equally spaced leader tape retaining portions 13 each thereof having a protuberance 12 at its tip to hold the leader tape 15.

Figure 4:
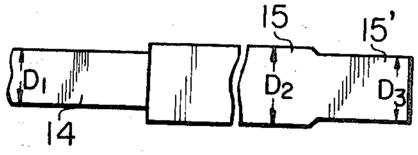
FIG. 4 is a fragmentary plan view of a magnetic tape and a leader tape contained in the cartridge.

On the pay-off reel 6 there is wound a magnetic tape 14 (whose width is $D_1$) having the leader tape 15 (whose width is $D_2$) bonded to its pay-off end. The leader tape 15 is wound on the pay-off reel 6 and retained in the space between the upper and lower flange stepped portions 10 and 11 by means of leader tape retaining portions 13, the escapement of the leader tape 15 in the radial outward direction being prevented by the protuberances 12. The leader tape 15 has a tip portion 15' having a width $D_3$ ($D_2 > D_3 > D_1$) as shown in FIG. 4, which too narrow to be retained within the retaining portions 13. The space 5 communicates with an opening or a window 16, through which the magnetic tape 14 and the leader tape 15 can go out of the cartridge 4. A leader tape holding lever 17 serves to urge the leader tape 15 toward the tape roll during rewinding.

With such a construction of the cartridge 6 as described above the tip portion 15' of the leader tape is not retained within the leader tape retaining portions 13 but will be projected out of the space between the upper and lower flanges 8 and 9. Thus, by merely rotating the pay-off reel 6 in the pay-off direction the leader tape tip portion 15' and the following main portion of the leader tape 15 can be successively paid off through the cartridge opening 16 owing to the rigidity of the leader tape tip portion 15' and the leader tape 15.

Figure 5:
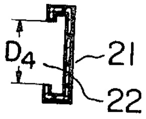
FIG. 5 is a sectional view showing a leader tape guide.
Figure 6:
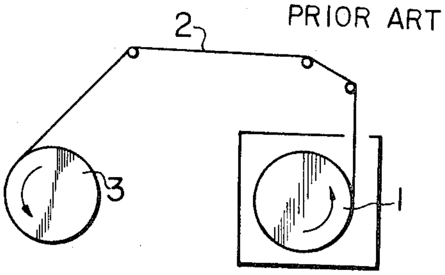
FIG. 6 PRIOR ART
FIG. 6 is a schematic plan view showing a prior art magnetic recording and reproducing system according to a conventional method of tape winding.

A tension pin 20 serves to detect a tension of the magnetic tape 14 as it passes along the surface of the pin 20 during recording or playback. A leader tape guide 21 serves to guide the leader tape 15 which goes out of the cartridge 4 and has a substantially C-shaped cross section as shown in FIG. 5, an opening 22 thereof having a width $D_4$ greater than that of the magnetic tape 14 and smaller than that of the leader tape 15 ($D_2 > D_3 > D_4 > D_1$). Thus, the leader tape 15 paid off through the cartridge opening 16 is guided by the leader tape guide 21, without going out of the opening 22, to reach the neighborhood of a take-up reel 23. On the other hand, the magnetic tape 14 can go out of the opening 22 to travel along guide posts 24 and 25 magnetic heads 26 and 27, as the magnetic tape 14 is driven by a capstan 28 and a pinch roller 29. The pay-off and take-up reels 6 and 23 are mounted on respective reel bases (not shown), which are driven by drive sources through belts, idlers and so forth, respectively. In the vicinity of the take-up reel 23 there is provided a well-known leader tape take-up means (not shown) for taking up the leader tape 15 paid off from the pay-off reel on a hub 30 of the take-up reel 23.

The way of winding of a tape according to this invention will now be described with reference to FIG. 1. The leader tape tip portion 15', which is paid off from the cartridge 4 through the opening 16 as the pay-off reel 6 is rotated in the direction shown by an arrow A, is guided by the leader tape guide 21 and is taken up on the hub 30 of the take-up reel 23 by means of the afore-mentioned leader tape take-up means as the take-up reel 23 is rotated in the direction shown by an arrow B, the direction of rotation of the take-up reel 23 being such that, while one surface of the leader tape 15 faces the core of the pay-off reel 6 when the leader tape 15 is wound thereon, the other surface of the leader tape 15 faces the core of the take-up reel 23 when the leader tape 15 is wound thereon. Then, when the magnetic tape 14 following the leader tape 15 is paid off through the cartridge opening 16, it gets out of the leader tape guide 21 through its opening 22 and travels along guide post 24, magnetic heads 26 and 27 and guide post 25 successively so that a state for recording or playback may be established.

What we claim is:

1. A magnetic recording and reproducing system of autothreading type comprising:

a magnetic tape;

a leader tape bonded to a pay-off end of said magnetic tape and having a greater width and greater rigidity than said magnetic tape;

a pay-off reel carrying said magnetic tape wound on its core, with said leader tape being wound in a space defined by a peripheral portion of flanges of said pay-off reel by means of leader tape retaining means provided in one of said flanges;

a cartridge containing said pay-off reel;

a take-up reel for taking up said leader tape and said magnetic tape following said leader tape; and guide means disposed between said pay-off and take-up reels for guiding said leader tape from said pay-off reel to said take-up reel to be wound on the latter such that opposite surfaces of said leader tape are disposed radially inwardly when said leader tape is wound respectively on said pay-off and take-up reels.

2. A magnetic recording and reproducing system of autothreading type according to claim 1, wherein said leader tape has a tip portion whose width is narrower than that of the rest of said leader tape and which tip portion does not engage with said leader tape retaining means.

3. A magnetic recording and reproducing system according to claim 1, wherein said guide means comprises an elongated channel member having a substantially C-shaped cross section.

* * * * *